(12) United States Patent
An

(10) Patent No.: US 12,008,925 B2
(45) Date of Patent: Jun. 11, 2024

(54) OPTICAL MODULE AND AEROSOL GENERATING DEVICE COMPRISING THEREOF

(71) Applicant: KT&G CORPORATION, Daejeon (KR)

(72) Inventor: Hwi Kyeong An, Seoul (KR)

(73) Assignee: KT&G CORPORATION, Daejeon (KR)

( * ) Notice: Subject to any disclaimer, the term of this patent is extended or adjusted under 35 U.S.C. 154(b) by 650 days.

(21) Appl. No.: 17/270,766

(22) PCT Filed: Dec. 10, 2020

(86) PCT No.: PCT/KR2020/018039
§ 371 (c)(1),
(2) Date: Feb. 23, 2021

(87) PCT Pub. No.: WO2021/172717
PCT Pub. Date: Sep. 2, 2021

(65) Prior Publication Data
US 2023/0016553 A1 Jan. 19, 2023

(30) Foreign Application Priority Data
Feb. 26, 2020 (KR) .................. 10-2020-0023920

(51) Int. Cl.
*G09F 23/04* (2006.01)
*A24F 40/40* (2020.01)
*G09F 19/20* (2006.01)

(52) U.S. Cl.
CPC ............. *G09F 23/04* (2013.01); *A24F 40/40* (2020.01); *G09F 19/205* (2013.01)

(58) Field of Classification Search
CPC ........ G09F 23/04; G09F 19/205; G09F 13/08; A24F 40/40; A24F 40/10; A24F 40/60;
(Continued)

(56) References Cited

U.S. PATENT DOCUMENTS 7,465,961 B2  12/2008 Masuda et al.
9,451,791 B2   9/2016 Sears et al.
(Continued)

FOREIGN PATENT DOCUMENTS

CN   204008442 U  * 12/2014
CN   106132223 A    11/2016
(Continued)

OTHER PUBLICATIONS

Offce Action dated Apr. 28, 2023 in Chinese Application No. 2020800057075.
(Continued)

*Primary Examiner* — Abdullah A Riyami
*Assistant Examiner* — Syed M Kaiser
(74) *Attorney, Agent, or Firm* — Sughrue Mion, PLLC

(57) ABSTRACT

An optical module includes a transmitter configured to pass light from a light source; an emitter integrally formed with the transmitter, and configured to emit light that has passed through the transmitter to outside of the optical module; and a converter covering at least a portion of the emitter, and configured to change a wavelength of light that has passed through the transmitter such that light emitted from the converter and light emitted from the emitter have different wavelengths.

8 Claims, 3 Drawing Sheets

(58) Field of Classification Search
CPC .......... A24F 40/20; A24F 40/50; A24F 40/46; A24F 40/465; A24F 40/51; A24F 40/57; G02B 19/0014; G02B 26/007; A24D 1/20
See application file for complete search history.

(56) References Cited

U.S. PATENT DOCUMENTS

| | | |
|---|---|---|
| 10,818,826 B2 | 10/2020 | Kang et al. |
| 2008/0232085 A1 | 9/2008 | Luettgens et al. |
| 2010/0059777 A1 | 3/2010 | Bechtel et al. |
| 2013/0270142 A1 | 10/2013 | Yao et al. |
| 2015/0166888 A1 | 6/2015 | Katsumoto et al. |
| 2015/0216233 A1 | 8/2015 | Sears et al. |
| 2015/0359265 A1 | 12/2015 | Liu |
| 2016/0233394 A1 | 8/2016 | Liu |
| 2017/0155020 A1 | 6/2017 | Lin et al. |
| 2017/0315405 A1 | 11/2017 | Masuda et al. |
| 2018/0020725 A1 | 1/2018 | Alarcon et al. |
| 2020/0268055 A1 | 8/2020 | An |

FOREIGN PATENT DOCUMENTS

| | | | | |
|---|---|---|---|---|
| CN | 208096024 U | | 11/2018 | |
| CN | 208403264 U | | 1/2019 | |
| CN | 109965354 A | * | 7/2019 | ............. A24F 40/53 |
| CN | 110045391 A | * | 7/2019 | ............. G01S 17/95 |
| EP | 2417219 | | 2/2012 | |
| EP | 2686603 | | 1/2014 | |
| EP | 3268663 | | 1/2018 | |
| JP | 11-224556 A | | 8/1999 | |
| JP | 2004-164893 A | | 6/2004 | |
| JP | 2004-296208 A | | 10/2004 | |
| JP | 2010-512014 A | | 4/2010 | |
| JP | 2010127918 A | * | 6/2010 | |
| JP | 2017-511690 A | | 4/2017 | |
| KR | 10-0659699 B1 | | 12/2006 | |
| KR | 10-2008-0040769 A | | 5/2008 | |
| KR | 10-2012-0078561 A | | 7/2012 | |
| KR | 10-1227350 B1 | | 2/2013 | |
| KR | 101227350 B1 | * | 2/2013 | |
| KR | 10-2013-0037121 A | | 4/2013 | |
| KR | 10-2015-0035742 A | | 4/2015 | |
| KR | 10-2019-0042913 A | | 4/2019 | |
| KR | 10-2019-0049402 A | | 5/2019 | |
| WO | 2010/116294 A1 | | 10/2010 | |
| WO | 2012/123841 A1 | | 9/2012 | |
| WO | 2016/142212 A1 | | 9/2016 | |
| WO | WO-2019170896 A1 | * | 9/2019 | ........... A24B 15/186 |

OTHER PUBLICATIONS

Notice of Reasons for Refusal dated Jun. 7, 2022 from the Japanese Patent Office in Japanese Application No. 2021-522039.
International Search Report dated Jun. 8, 2021 in International Application No. PCT/KR2020/018039.
Office Action dated Nov. 22, 2021 in Korean Application No. 10-2020-0023920.
Extended European Search Report dated Nov. 26, 2021 in EP Application No. 20855892.4.

* cited by examiner

【Figure 1】
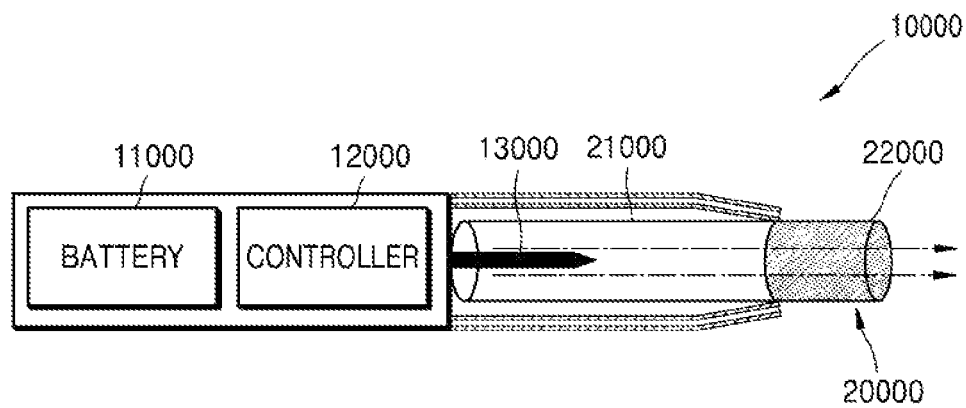
【Figure 2】
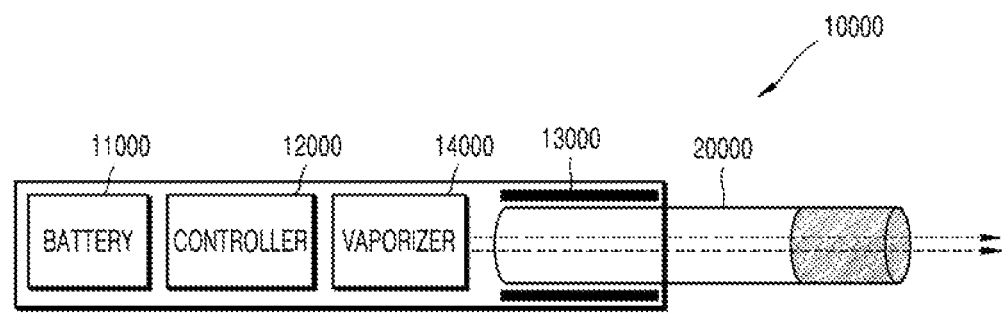
【Figure 3】
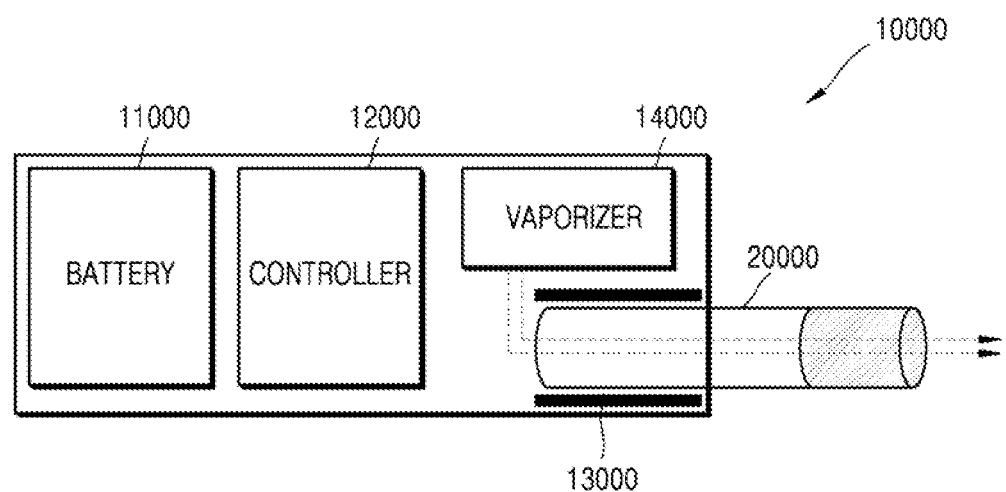

[Figure 4]
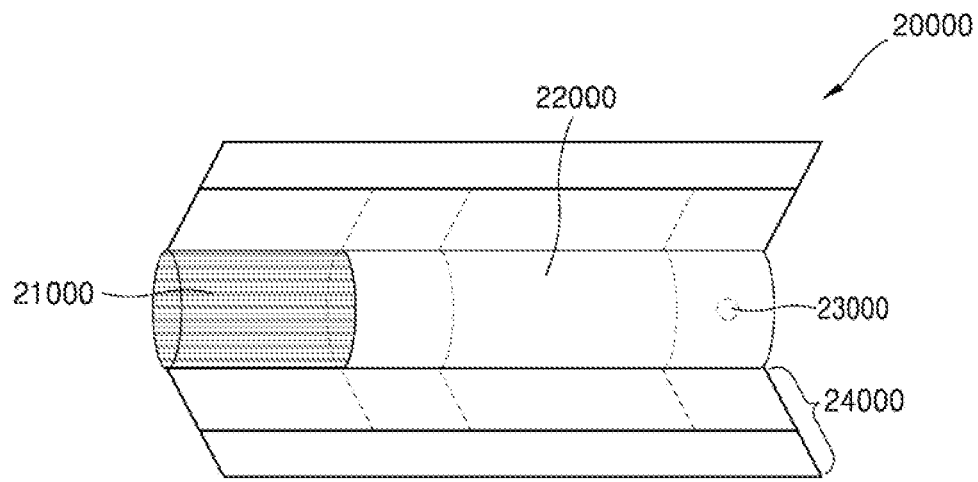
[Figure 5]
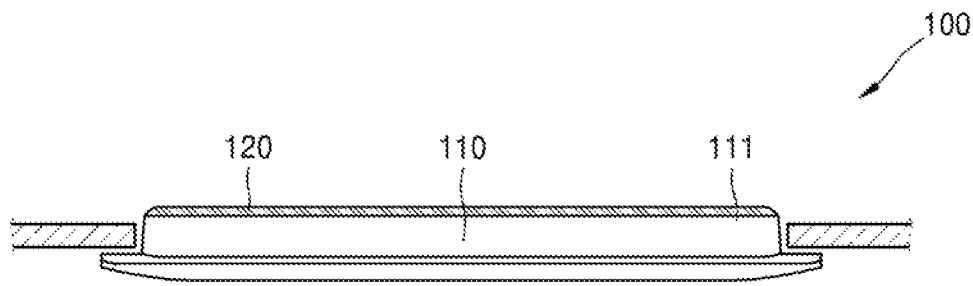
[Figure 6]
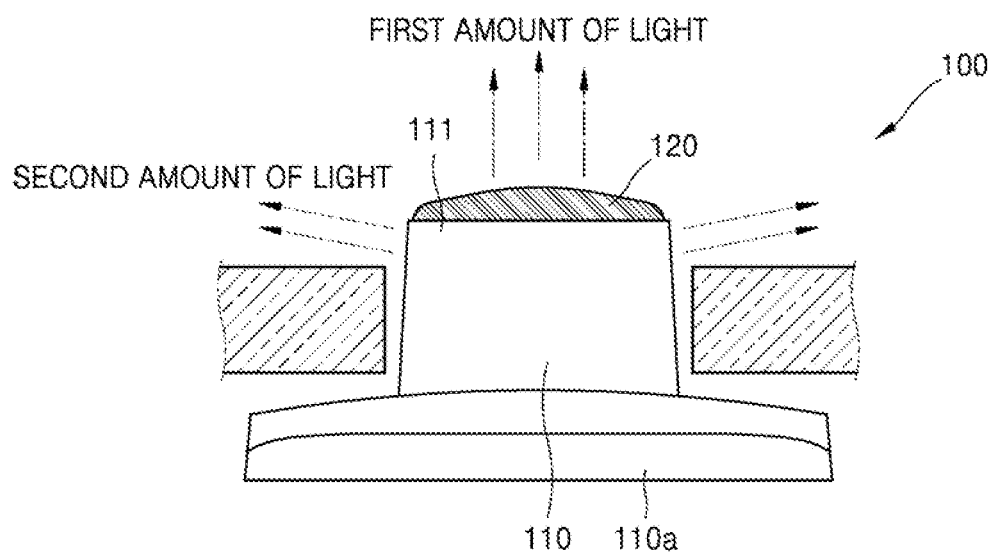

[Figure 7]
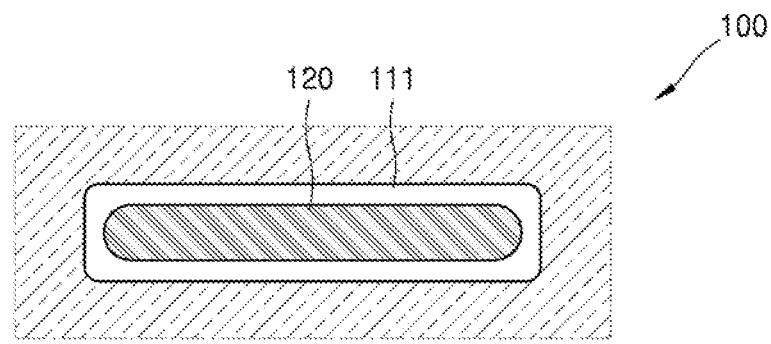
[Figure 8]
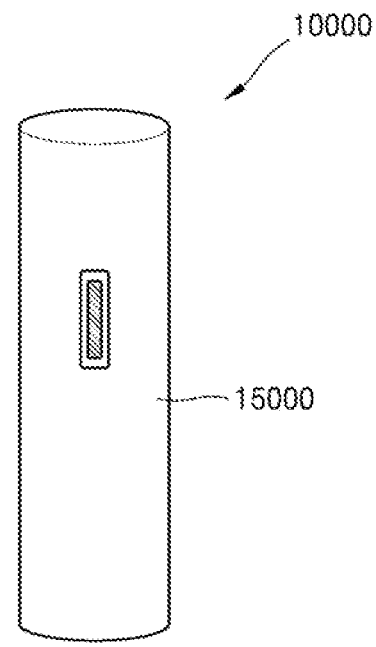

OPTICAL MODULE AND AEROSOL GENERATING DEVICE COMPRISING THEREOF

TECHNICAL FIELD

One or more embodiments of the present disclosure relate to an optical module and an aerosol generating device including the same, and more particularly, to an optical module for emitting light of different wavelengths and an aerosol generating device including the optical module.

BACKGROUND ART

Recently, optical modules are included in electronic devices and are widely used for various functions, for example, to indicate states of devices and provide aesthetic effects to the devices. Generally, an optical module for converting light from one light source into light having two or more wavelengths may be manufactured by coupling components made of materials having different transmittance or by double-injecting and molding different materials.

Among existing optical modules for emitting light having two or more wavelengths, an optical module in which components including different materials are coupled has poor transmittance of light emitted from a light source, because of a gap present between coupling surfaces of the components. Also, in the case of an optical module in which different materials are double-injected, it is difficult to form a structure in which only a portion of a light emitting member changes a wavelength of light.

DISCLOSURE

Technical Problem

Technical problems to be solved by one or more embodiments of the present disclosure are to provide an optical module and an aerosol generating device including the same. In more detail, one or more embodiments provide an optical module for emitting light of different wavelengths and an aerosol generating device including the optical module.

The technical problems of the present disclosure are not limited to the aforementioned description, and other technical problems may be clearly understood by one of ordinary skill in the art from the present specification and the attached drawings.

Technical Solution

According to an aspect of the present disclosure, an optical module includes a transmitter configured to pass light from a light source; an emitter integrally formed with the transmitter, and configured to emit light that has passed through the transmitter to outside of the optical module; and a converter covering at least a portion of the emitter, and configured to change a wavelength of light that has passed through the transmitter such that light emitted from the converter and light emitted from the emitter have different wavelengths.

Advantageous Effects

An optical module according to one or more embodiments may simultaneously emit light of different wavelengths because a converter for converting a wavelength or the amount of light is disposed on part of a region where light is emitted. Also, an aerosol generating device according to another embodiment may include an optical module and thus may perform a display function of displaying a state of the aerosol generating device in an aesthetic manner.

Effects according to one or more embodiments are not limited to the aforementioned effects, and other effects may be clearly understood by one of ordinary skill in the art from the present specification and the attached drawings.

DESCRIPTION OF DRAWINGS

FIGS. 1 through 3 are diagrams showing examples in which a cigarette is inserted into an aerosol generating device.

FIG. 4 illustrates an example of the cigarette 20000.

FIG. 5 is a schematic front view illustrating an optical module according to an embodiment.

FIG. 6 is a schematic side view of an optical module according to an embodiment.

FIG. 7 is a schematic top view of an optical module according to an embodiment.

FIG. 8 is a schematic diagram of an aerosol generating device including an optical module according to an embodiment.

BEST MODE

According to an aspect of the present disclosure, an optical module includes a transmitter configured to pass light from a light source; an emitter integrally formed with the transmitter, and configured to emit light that has passed through the transmitter to outside of the optical module; and a converter covering at least a portion of the emitter, and configured to change a wavelength of light that has passed through the transmitter such that light emitted from the converter and light emitted from the emitter have different wavelengths.

The converter may change an amount of light that has passed through the transmitter such that an amount of light emitted from the converter is less than an amount of light emitted from the emitter.

The transmitter may further include an incident surface on which the light from the light source is incident, and an area of the incident surface may be greater than an area of the converter.

The converter may be curved such that light exiting the converter is scattered.

At least a portion of the converter may include a colorant material.

According to another aspect of the present disclosure, an aerosol generating device includes the above-described optical module according to the one or more embodiments, a heater configured to heat an aerosol generating material, and a main body including a controller configured to control power supplied to the heater, wherein the optical module is arranged on a surface of the main body.

The transmitter is disposed inside the main body, and the emitter is exposed out of the main body.

When the heater is preheated to a target temperature, the controller may change a wavelength of light emitted from the light source when the heater is preheated to a target temperature.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIGS. 1 through 3 are diagrams showing examples in which a cigarette is inserted into an aerosol generating device.

Referring to FIG. 1, the aerosol generating device 10000 may include a battery 11000, a controller 12000, and a heater 13000. Referring to FIGS. 2 and 3, the aerosol generating device 10000 may further include a vaporizer 14000. Also, a cigarette 20000 may be inserted into an inner space of the aerosol generating device 10000.

FIGS. 1 through 3 illustrate components of the aerosol generating device 10000, which are related to some embodiments. Therefore, it will be understood by one of ordinary skill in the art that other components may be further included in the aerosol generating device 10000, in addition to the components illustrated in FIGS. 1 through 3.

Also, FIGS. 2 and 3 illustrate that the aerosol generating device 10000 includes the heater 13000. However, as necessary, the heater 13000 may be omitted.

FIG. 1 illustrates that the battery 11000, the controller 12000, and the heater 130000 are arranged in series. Also, FIG. 2 illustrates that the battery 11000, the controller 12000, the vaporizer 14000, and the heater 13000 are arranged in series. Also, FIG. 3 illustrates that the vaporizer 14000 and the heater 13000 are arranged in parallel. However, the internal structure of the aerosol generating device 10000 is not limited to the structures illustrated in FIGS. 1 through 3. In other words, according to the design of the aerosol generating device 10000, the battery 11000, the controller 12000, the heater 13000, and the vaporizer 14000 may be differently arranged.

When the cigarette 20000 is inserted into the aerosol generating device 10000, the aerosol generating device 10000 may operate the heater 13000 and/or the vaporizer 14000 to generate an aerosol from the cigarette 20000 and/or the vaporizer 14000. The aerosol generated by the heater 13000 and/or the vaporizer 14000 is delivered to a user by passing through the cigarette 20000.

According to necessity, even when the cigarette 20000 is not inserted into the aerosol generating device 10000, the aerosol generating device 10000 may heat the heater 13000.

The battery 11000 supplies electric power to be used for the aerosol generating device 10000 to operate. For example, the battery 11000 may supply power to heat the heater 13000 or the vaporizer 14000, and may supply power for operating the controller 12000. Also, the battery 11000 may supply power for operations of a display, a sensor, a motor, etc. mounted in the aerosol generating device 10000.

The controller 12000 may generally control operations of the aerosol generating device 10000. In detail, the controller 12000 may control not only operations of the battery 11000, the heater 13000, and the vaporizer 14000, but also operations of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13000 may be heated by the power supplied from the battery 11000. For example, when the cigarette 20000 is inserted into the aerosol generating device 10000, the heater 13000 may be located outside the cigarette 20000. Thus, the heated heater 13000 may increase a temperature of an aerosol generating material in the cigarette 20000.

The heater 13000 may include an electro-resistive heater. For example, the heater 13000 may include an electrically conductive track, and the heater 13000 may be heated when currents flow through the electrically conductive track. However, the heater 13000 is not limited to the example described above and may include all heaters which may be heated to a desired temperature. Here, the desired temperature may be pre-set in the aerosol generating device 10000 or may be set as a temperature desired by a user.

As another example, the heater 13000 may include an induction heater. In detail, the heater 13000 may include an electrically conductive coil for heating a cigarette in an induction heating method, and the cigarette may include a susceptor which may be heated by the induction heater.

For example, the heater 13000 may include a tube-type heating element, a plate-type heating element, a needle-type heating element, or a rod-type heating element, and may heat the inside or the outside of the cigarette 20000, according to the shape of the heating element.

Also, the aerosol generating device 10000 may include a plurality of heaters 13000. Here, the plurality of heaters 13000 may be inserted into the cigarette 20000 or may be arranged outside the cigarette 20000. Also, some of the plurality of heaters 13000 may be inserted into the cigarette 20000 and the others may be arranged outside the cigarette 20000. In addition, the shape of the heater 13000 is not limited to the shapes illustrated in FIGS. 1 through 3 and may include various shapes.

The vaporizer 14000 may generate an aerosol by heating a liquid composition and the generated aerosol may pass through the cigarette 20000 to be delivered to a user. In other words, the aerosol generated via the vaporizer 14000 may move along an air flow passage of the aerosol generating device 10000 and the air flow passage may be configured such that the aerosol generated via the vaporizer 14000 passes through the cigarette 20000 to be delivered to the user.

For example, the vaporizer 14000 may include a liquid storage, a liquid delivery element, and a heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 14000 or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14000 may be referred to as a cartomizer or an atomizer, but it is not limited thereto.

The aerosol generating device 10000 may further include other components in addition to the battery 11000, the controller 12000, the heater 13000, and the vaporizer 14000. For example, the aerosol generating device 10000 may include a display capable of outputting visual information and/or a motor for outputting haptic information. Also, the aerosol generating device 10000 may include at least one sensor (e.g., a puff detecting sensor, a temperature detecting sensor, a cigarette insertion detecting sensor, etc.). Also, the aerosol generating device 10000 may be formed as a structure where, even when the cigarette 20000 is inserted into the aerosol generating device 10000, external air may be introduced or internal air may be discharged.

Although not illustrated in FIGS. 1 through 3, the aerosol generating device 10000 and an additional cradle may form together a system. For example, the cradle may be used to charge the battery 11000 of the aerosol generating device 10000. Also, the heater 13000 may be heated while the cradle and the aerosol generating device 10000 are coupled to each other.

The cigarette 20000 may be similar as a general combustive cigarette. For example, the cigarette 20000 may be divided into a first portion including an aerosol generating material and a second portion including a filter, etc. Alternatively, the second portion of the cigarette 20000 may also include an aerosol generating material. For example, an aerosol generating material made in the form of granules or capsules may be inserted into the second portion.

The entire first portion may be inserted into the aerosol generating device 10000, and the second portion may be exposed to the outside. Alternatively, only a portion of the first portion may be inserted into the aerosol generating device 10000, or the entire first portion and a portion of the second portion may be inserted into the aerosol generating device 10000. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 10000. For example, the opening and closing and/or a size of the air passage formed in the aerosol generating device 10000 may be adjusted by the user. Accordingly, the amount of smoke and a smoking impression may be adjusted by the user. As another example, the external air may flow into the cigarette 20000 through at least one hole formed in a surface of the cigarette 20000.

Hereinafter, an example of the cigarette 20000 will be described with reference to FIG. 4.

FIG. 4 illustrates an example of a cigarette.

Referring to FIG. 4, the cigarette 20000 may include a tobacco rod 21000 and a filter rod 22000. The first portion 21000 described above with reference to FIGS. 1 through 3 may correspond to the tobacco rod 21000, and the second portion may correspond to the filter rod 22000.

FIG. 4 illustrates that the filter rod 22000 includes a single segment. However, the filter rod 22000 is not limited thereto. In other words, the filter rod 22000 may include a plurality of segments. For example, the filter rod 22000 may include a first segment configured to cool an aerosol and a second segment configured to filter a certain component included in the aerosol. Also, according to necessity, the filter rod 22000 may further include at least one segment configured to perform other functions.

The cigarette 2000 may be packaged by at least one wrapper 24000. The wrapper 24000 may have at least one hole through which external air may be introduced or internal air may be discharged. For example, the cigarette 20000 may be packaged by one wrapper 24000. As another example, the cigarette 20000 may be double-packaged by at least two wrappers 24000. For example, the tobacco rod 21000 may be packaged by a first wrapper, and the filter rod 22000 may be packaged by a second wrapper. Also, the tobacco rod 21000 and the filter rod 22000, which are respectively packaged by separate wrappers, may be coupled to each other, and the entire cigarette 20000 may be packaged by a third wrapper. When each of the tobacco rod 21000 and the filter rod 22000 includes a plurality of segments, each segment may be packaged by a separate wrapper. Also, the plurality of segments may be respectively packaged by the separate wrappers and coupled to each other, and the entire cigarette 20000 may be re-packaged by another wrapper.

The tobacco rod 21000 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21000 may include other additives, such as flavors, a wetting agent, and/or organic acid. Also, the tobacco rod 21000 may include a flavored liquid, such as menthol or a moisturizer, which is injected to the tobacco rod 21000.

The tobacco rod 21000 may be manufactured in various forms. For example, the tobacco rod 21000 may be formed as a sheet or a strand. Also, the tobacco rod 21000 may be formed as a pipe tobacco, which is formed of tiny bits cut from a tobacco sheet. Also, the tobacco rod 21000 may be surrounded by a heat conductive material. For example, the heat-conducting material may be, but is not limited to, a metal foil such as aluminum foil. For example, the heat conductive material surrounding the tobacco rod 21000 may uniformly distribute heat transmitted to the tobacco rod 21000, and thus, the heat conductivity applied to the tobacco rod may be increased and taste of the tobacco may be improved. Also, the heat conductive material surrounding the tobacco rod 21000 may function as a susceptor heated by the induction heater. Here, although not illustrated in the drawings, the tobacco rod 21000 may further include an additional susceptor, in addition to the heat conductive material surrounding the tobacco rod 21000.

The filter rod 22000 may include a cellulose acetate filter. Shapes of the filter rod 22000 are not limited. For example, the filter rod 22000 may include a cylinder-type rod or a tube-type rod having a hollow inside. Also, the filter rod 22000 may include a recess-type rod. When the filter rod 22000 includes a plurality of segments, at least one of the plurality of segments may have a different shape.

The filter rod 22000 may be formed to generate flavors. For example, a flavoring liquid may be injected onto the filter rod 22000, or an additional fiber coated with a flavoring liquid may be inserted into the filter rod 22000.

Also, the filter rod 22000 may include at least one capsule 23000. Here, the capsule 23000 may generate a flavor or an aerosol. For example, the capsule 23000 may have a configuration in which a liquid containing a flavoring material is wrapped with a film. For example, the capsule 23000 may have a spherical or cylindrical shape, but is not limited thereto.

When the filter rod 22000 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Although not illustrated in FIG. 4, the cigarette 20000 according to an embodiment may further include a front-end filter. The front end plug may be located on one side of the tobacco rod 21000 which is not facing the filter rod 22000. The front-end filter may prevent the tobacco rod 21000 from being detached and prevent a liquefied aerosol from flowing into the aerosol generating device 10000 (FIGS. 1 through 3) from the tobacco rod 21000, during smoking.

FIG. 5 is a schematic front view of an optical module 100 according to an embodiment.

Referring to FIG. 5, the optical module 100 may include a transmitter 110, an emitter 111, and a converter 120.

Light emitted from a light source may pass through the transmitter 110. The emitter 111 may be a portion of the transmitter 110 which is exposed to the outside. The light passing through the transmitter 110 may be emitted to the outside through the emitter 111.

The transmitter 110 and the emitter 111 may include the same material and may be integrally formed. Materials of the transmitter 110 and the emitter 111 may allow the light to pass through or diffuse. For example, materials of the transmitter 110 and the emitter 111 may be polycarbonate (PC), but are not limited thereto.

The converter 120 may cover at least a portion of the emitter 111. The converter 120 may convert a wavelength and amount of light emitted from the light source.

The converter 120 may be curved so that the light may be scattered. For example, a surface of the converter 120 through which light is emitted may have a positive curvature towards the outside. Therefore, the light emitted from the light source may widely diffuse because of the convex surface, and thus, the optical module 100 may effectively indicate a state of a device for a user.

FIG. 6 is a schematic side view of the optical module 100 according to an embodiment.

Referring to FIG. 6, the converter 120 may include a material for adjusting the amount of light. For example, a first amount of light may be emitted from the emitter 111 to the outside, and a second amount of light, which is less than the first amount of light, may be emitted from the converter 120 to the outside because of the material for adjusting the amount of light. Therefore, by the difference in the amount of light between the emitter 111 and the converter 120, the optical module 100 may simultaneously emit light of the same color and different chroma.

The transmitter 110 may further include an incident surface 110a that receives incident light emitted from the light source. The light source may be located under the incident surface 110a. Also, an area of the incident surface 110a may be greater than that of the converter 120. The light, which is incident on the incident surface 110a, may penetrate the emitter 111 and the converter 120 through total reflection. In this case, the incident light may reach the emitter 111 and the converter 120 without any loss, and thus, even a light source emitting a small amount of light may provide light having sufficient brightness to the outside. Therefore, when the area of the incident surface 110a of the transmitter 110 is greater than the area of the converter 120, the optical module 100 may effectively emit light to the outside.

FIG. 7 is a schematic top view of the optical module 100 according to an embodiment.

Referring to FIG. 7, when the optical module 100 is viewed from the outside, the converter 120 and the emitter 111 may only be exposed to the outside. Because the light emitted from the emitter 111 and the light emitted from the converter 120 have different wavelengths, the light of different wavelengths may be naturally arranged and delivered to the user. Therefore, the optical module 100 may display a state of a device in an aesthetic manner.

The optical module 100 according to an embodiment may be manufactured by forming the transmitter 110 and the emitter 111 by molding and adding the material for the converter 120 on at least a portion of the emitter 111.

For example, the transmitter 110 and the emitter 111 may be injection-molded in a high-temperature environment. A film including a print layer including a colorant material may be disposed on at least a portion of the upper surface of the molded body (i.e., the transmitter 110 and emitter 111). For example, the film may be an in-mold transfer film. The film may be pressed by a die in a high-temperature environment, and the colorant material included in the print layer may be transferred to a portion of the upper surface of the transmitter 110.

After the above-described process, the film may be removed. The portion of the upper surface of the transmitter 110, on which the colorant material is transferred, may form the converter 120.

The manufactured optical module 100 may be included in the aerosol generating device 10000 in such a way that at least a portion of the transmitter 110 is exposed to the outside, which forms the emitter 111.

The colorant material transferred to the converter 120 may convert a wavelength of the light from the light source. One or more colorant materials may be transferred to the converter 120.

FIG. 8 is a schematic diagram of the aerosol generating device 10000 including the optical module 100 according to an embodiment.

The aerosol generating device 10000 may include the heater 13000 heating the aerosol generating material and a main body 15000 including the controller 12000 controlling power supplied to the heater 13000, and the optical module 100 may be arranged on a surface of the main body 15000.

Referring to FIG. 8, the optical module 100 may be arranged on the main body 15000 such that at least a portion of the transmitter 110 is exposed to the outside of the main body 15000. A portion of the transmitter 110, which protrudes to the outside of the aerosol generating device 10000, may form the emitter 111. Also, the converter 120, which converts the wavelength and the amount of light, may cover at least a portion of the emitter 111.

The optical module 100 may indicate a state of the aerosol generating device 10000 by emitting light having two or more wavelengths. The light source located under the incident surface 110a may select one of the colors determined in advance and may emit the selected color of light. The light may be incident on the incident surface 110a of the optical module 100.

The optical module 100 may simultaneously emit, to the user, a visible ray through the emitter 111 without any conversion and another visible ray of which a wavelength and/or light amount through the converter 120. Therefore, the optical module 100 may display an internal operation state of the aerosol generating device 10000 to the user by using a visible ray in which the same color is arranged or similar colors are arranged in an aesthetic manner.

The controller 12000 may control operations of the light source. The controller 12000 may control power supplied to the heater 13000, according to the operation of the aerosol generating device 10000. The heater 13000 may be preheated to a target temperature, and while the heater 13000 is preheated, the controller 12000 may control the light source to emit a visible ray corresponding to a predetermined color. For example, in the visible ray emitted while the heater 13000 is preheated, red and a similar color may be arranged.

Also, when the heater 13000 is preheated to the target temperature, the controller 12000 may cause a wavelength of the visible ray, which is emitted while the heater 13000 is preheated, to be changed. When the preheating of the heater 13000 is completed, the emitted visible ray may display blue along with a similar color.

As described above, the optical module 100 included in the aerosol generating device 10000 may display the state of the device for the user.

At least one of the components, elements, modules or units (collectively "components" in this paragraph) represented by a block in the drawings, such as the controller 12000, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An optical module comprising:
    a transmitter configured to pass light from a light source;
    an emitter integrally formed with the transmitter, and configured to emit light that has passed through the transmitter to an outside of the optical module; and
    a converter provided on a surface of the emitter and covering at least a portion of the emitter, the converter configured to emit light to the outside of the optical module and change a wavelength of light that has passed through the transmitter such that the light emitted from the converter to the outside of the optical module and the light emitted from the emitter to the outside of the optical module have different wavelengths.

2. The optical module of claim 1, wherein the converter is further configured to change an amount of light that has passed through the transmitter such that an amount of light emitted from the converter is less than an amount of light emitted from the emitter.

3. The optical module of claim 1, wherein
the transmitter comprises an incident surface configured to receive light from the light source, and
an area of the incident surface is greater than an area of the converter.

4. The optical module of claim 1, wherein the converter is curved such that light exiting the converter is scattered.

5. The optical module of claim 1, wherein at least a portion of the converter includes a colorant material.

6. An aerosol generating device comprising:
the optical module of claim 1;
a heater configured to heat an aerosol generating material; and
a main body comprising a controller configured to control power supplied to the heater,
wherein the optical module is arranged on a surface of the main body.

7. The aerosol generating device of claim 6, wherein the transmitter is disposed inside the main body, and the emitter is exposed out of the main body.

8. The aerosol generating device of claim 6, wherein the controller is configured to change a wavelength of light emitted from the light source when the heater is preheated to a target temperature.

* * * * *